United States Patent
Bai et al.

(10) Patent No.: US 12,438,596 B2
(45) Date of Patent: Oct. 7, 2025

(54) METHODS AND APPARATUS FOR PORT MAPPING FOR A REPEATER

(71) Applicant: QUALCOMM Incorporated, San Diego, CA (US)

(72) Inventors: Tianyang Bai, Somerville, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/345,869

(22) Filed: Jun. 11, 2021

(65) Prior Publication Data

US 2022/0399934 A1 Dec. 15, 2022

(51) Int. Cl.
*H04B 7/155* (2006.01)
*H04B 7/0426* (2017.01)
*H04B 7/0456* (2017.01)
*H04B 7/06* (2006.01)
*H04L 5/00* (2006.01)

(52) U.S. Cl.
CPC ....... *H04B 7/15528* (2013.01); *H04B 7/0426* (2013.01); *H04B 7/0456* (2013.01); *H04B 7/0617* (2013.01); *H04B 7/15571* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 11,310,024 B2* | 4/2022 | Krishnaswamy | H04L 5/1461 |
| 11,375,527 B1* | 6/2022 | Eyuboglu | H04B 7/15528 |
| 2013/0183895 A1* | 7/2013 | Gore | H04B 7/15571 |
| | | | 455/7 |
| 2015/0200722 A1* | 7/2015 | Kang | H04B 7/1555 |
| | | | 370/315 |
| 2019/0181943 A1* | 6/2019 | Liang | H04L 25/0204 |
| 2020/0280127 A1 | 9/2020 | Hormis et al. | |
| 2021/0135734 A1 | 5/2021 | Abedini et al. | |
| 2022/0393841 A1* | 12/2022 | Tsai | H04B 7/08 |

OTHER PUBLICATIONS

Liu et al. Capacity Enhancement Measurements of Passive Repeater for Tri Polarized MIMO Channel (Year: 2015).*
International Search Report and Written Opinion—PCT/US2022/072604—ISA/EPO—Sep. 16, 2022.

* cited by examiner

*Primary Examiner* — Luna Weissberger
(74) *Attorney, Agent, or Firm* — Arent Fox, LLP

(57) ABSTRACT

Aspects of the present disclosure include methods, apparatuses, and computer readable media for receiving, via a plurality of input ports, one or more input signals carrying information via one or more input ports of the plurality of input ports, transforming, via a mapping module each of the one or more input signals into two or more output signals carrying the information, amplifying the two or more output signals, and transmitting, coherently, the amplified two or more output signals in a multiple-in multiple-out (MIMO) network.

26 Claims, 9 Drawing Sheets

METHODS AND APPARATUS FOR PORT MAPPING FOR A REPEATER

BACKGROUND

Aspects of the present disclosure relate generally to wireless communications, and more particularly, to apparatuses and methods for port mapping for a repeater.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, the coverage of signal transmission is important. A base station (BS) may be unable to transmit information directly to a user equipment (UE). Similarly a UE may be unable to transmit information directly to a BS. In the network densification scheme having a mixture of access nodes of different types and functionalities, it is desirable to provide a reliable coverage within the network while minimizing costs. Therefore, improvements in extending network coverage may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a repeater for receiving, via a plurality of input ports, one or more input signals carrying information via one or more input ports of the plurality of input ports, transforming, via a mapping module each of the one or more input signals into two or more output signals carrying the information, amplifying the two or more output signals, and transmitting, coherently, the amplified two or more output signals in a multiple-in multiple-out (MIMO) network.

Other aspects of the present disclosure include a repeater including a plurality of input ports configured to receive one or more input signals carrying information via one or more input ports of the plurality of input ports, a mapping module configured to transform each of the one or more input signals into two or more output signals carrying the information, and a plurality of output ports configured to amplify the two or more output signals and transmit, coherently, the amplified two or more output signals in a multiple-in multiple-out (MIMO) network.

An aspect of the present disclosure includes a repeater including means for receiving, via a plurality of input ports, one or more input signals carrying information via one or more input ports of the plurality of input ports, means for transforming, via a mapping module each of the one or more input signals into two or more output signals carrying the information, means for amplifying the two or more output signals, and means for transmitting, coherently, the amplified two or more output signals in a multiple-in multiple-out (MIMO) network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
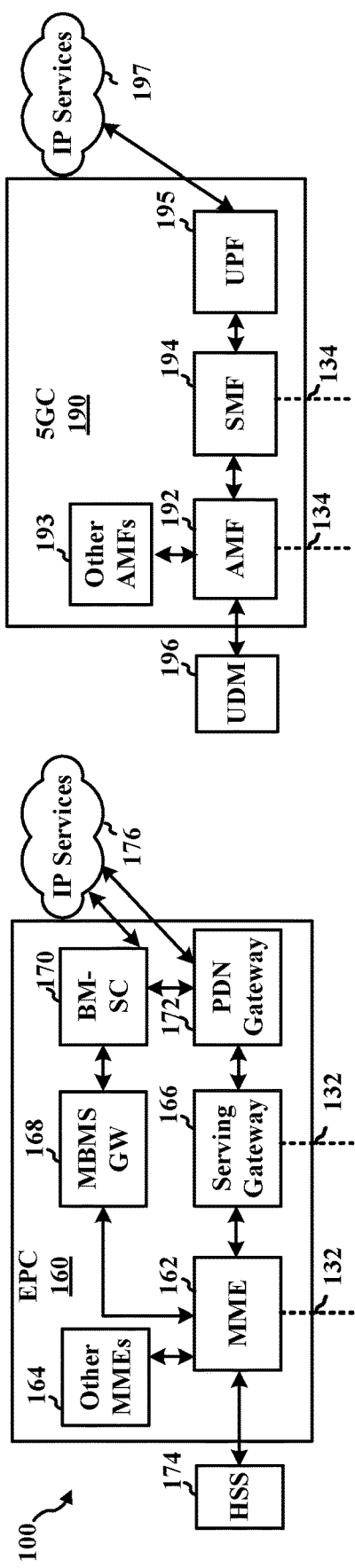
FIG. 1 is a diagram illustrating an example of a wireless communications system and an access network according to aspects of the present disclosure.
Figure 1:
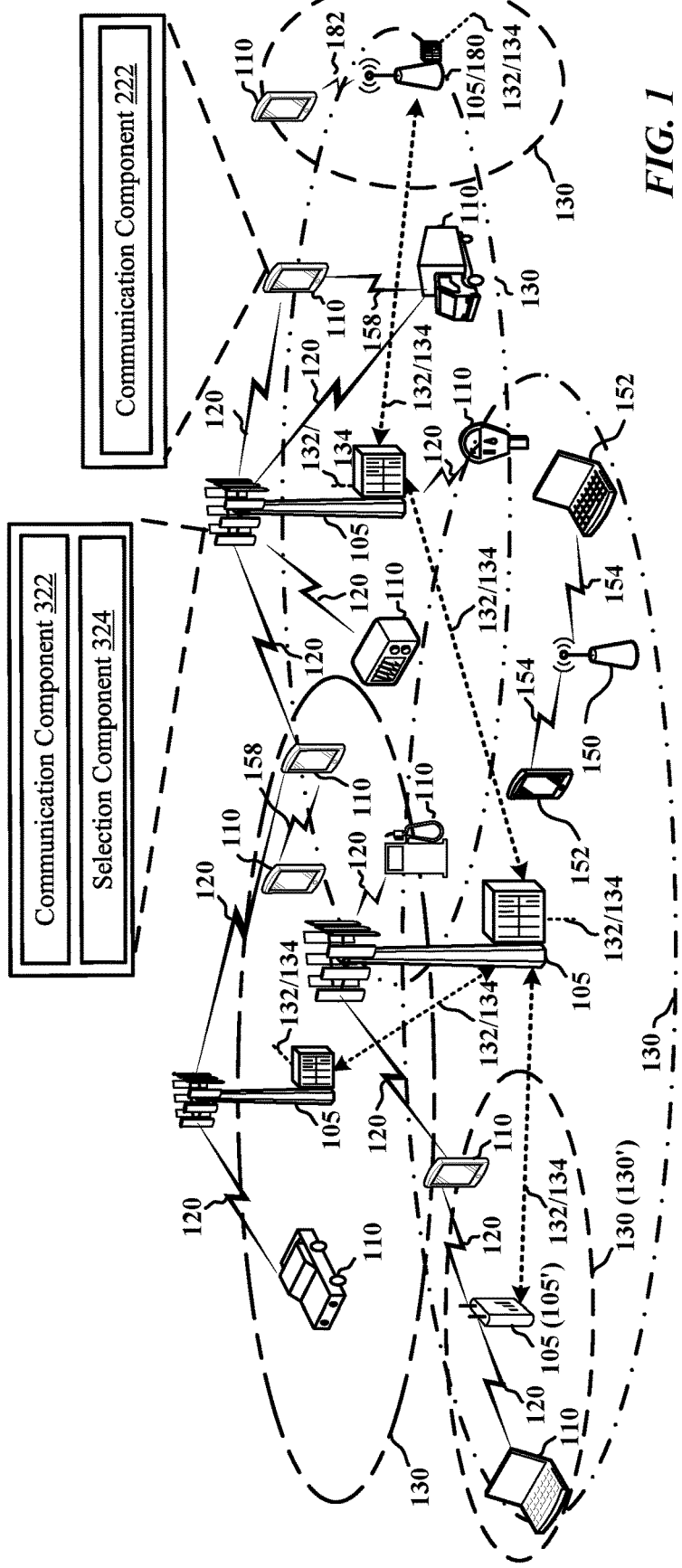

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one implementation, a network may include multiple access nodes, such as base stations, full-stack base stations (e.g., gNBs), integrated access and backhaul (IAB) nodes enabling in-band self-backhauling, one or more radio frequency (RF) repeaters, wired remote radio heads, wireless remote unites (e.g., digital repeaters, level 1 relays), intelligent reflecting surfaces, etc. Conventional RF repeaters may amplify and forward signals in the analog domain, with no digital-analog-conversion and/or decoding in the digital domain. For example, the conventional RF repeaters may be unaware of timing (uplink (UL) or downlink (DL)) information, and simply amplify and forward any signal received. The conventional RF repeaters may be unaware of spatial information (i.e., preconfigured with fixed reception (RX) and/or transmission (TX) beams).

An aspect of the present disclosure includes a repeater that is configured to implement timing control (e.g., DL/UL awareness, when to turn on/off in each direction) and/or beamforming control (e.g., which beamforming direction to forward the package). The repeater according to aspects of the present disclosure may include multi-beams adaptive over time and utilize DL/UL splits.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. In some implementations, the communication component 222 may be implemented using hardware, software, or a combination of hardware and software. In some implementations, the BS 105 may include a communication component 322 configured to communicate with the UE 110. The BS 105 may include a selection component 324 configured to select one or more port mappings of a repeater. In some implementations, the communication component 322 and/or the selection component 324 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

ABS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
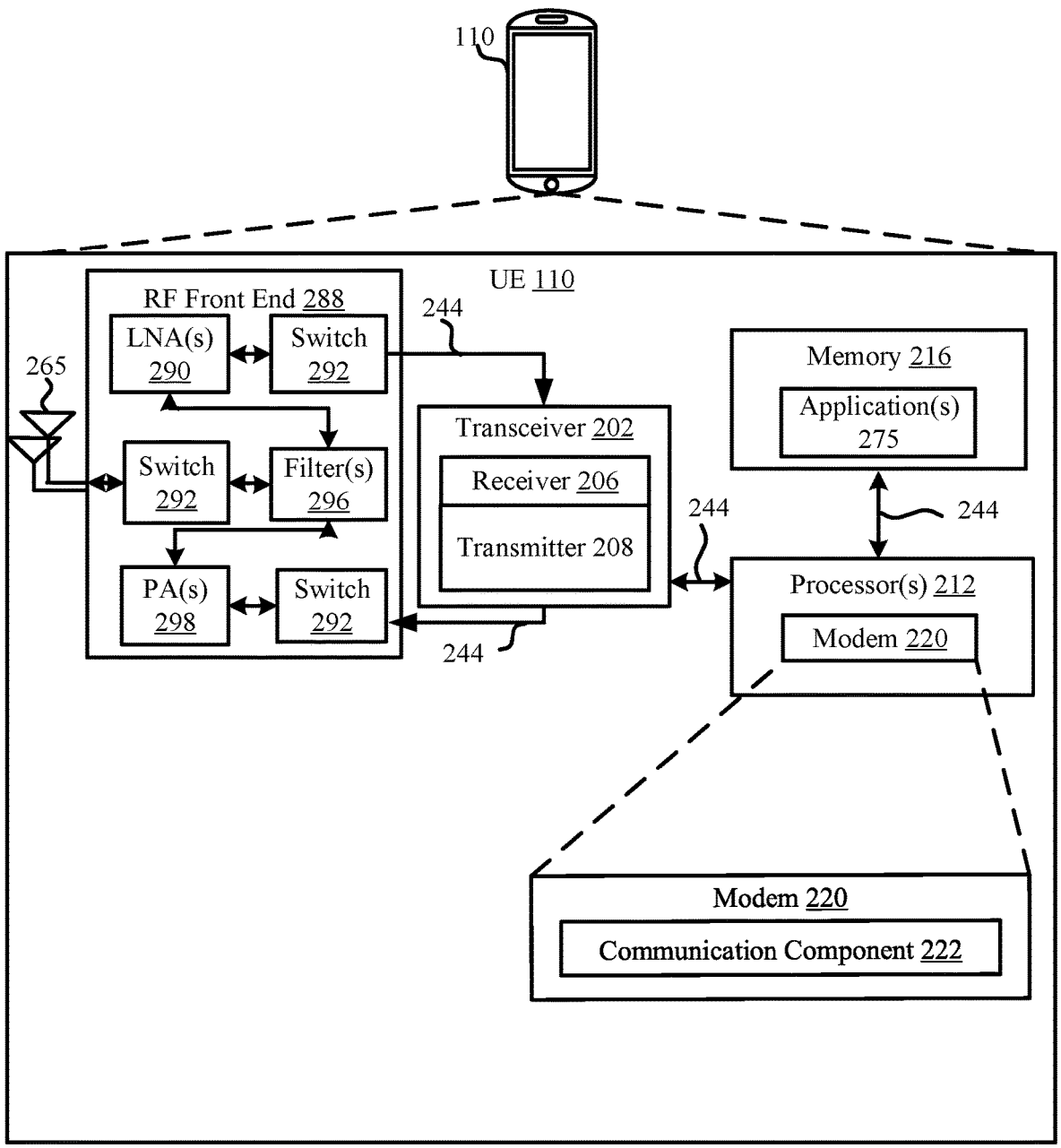
FIG. 2 is a schematic diagram of an example of a user equipment according to aspects of the present disclosure.

Referring to FIG. 2, one example of an implementation of the UE 110 may include a modem 220 having the communication component 222. In one implementation, the UE 110 may include a communication component 222 configured to communicate with the BS 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, and/or one or more of the subcomponents, and/or data associated therewith, when UE 110 is operating at least one processor 212 to execute the communication component 222, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
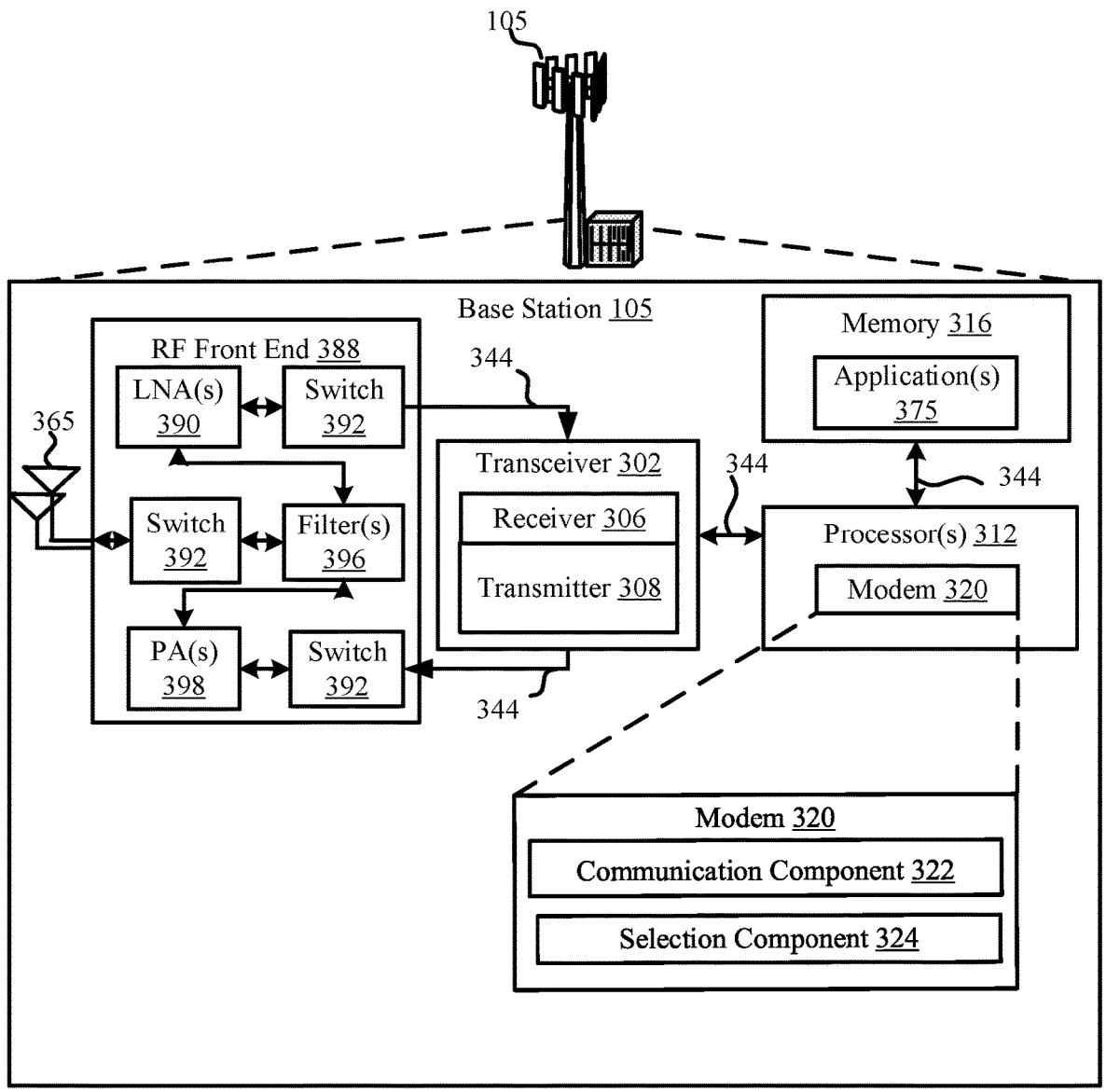
FIG. 3 is a schematic diagram of an example of a base station according to aspects of the present disclosure.

Referring to FIG. 3, one example of an implementation of the BS 105 may include a modem 320 having the communication component 322 and/or the selection component 324. In some implementations, the BS 105 may include a communication component 322 configured to communicate with the UE 110. The BS 105 may include a selection component 324 configured to select one or more port mappings of a repeater.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 and/or the selection component 324 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322 and/or the selection component 324, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or the selection component 324, and/or one or more of the subcomponents, and/or data associated therewith, when the BS 105 is operating at least one processor 312 to execute the communication component 322 and/or the selection component 324, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
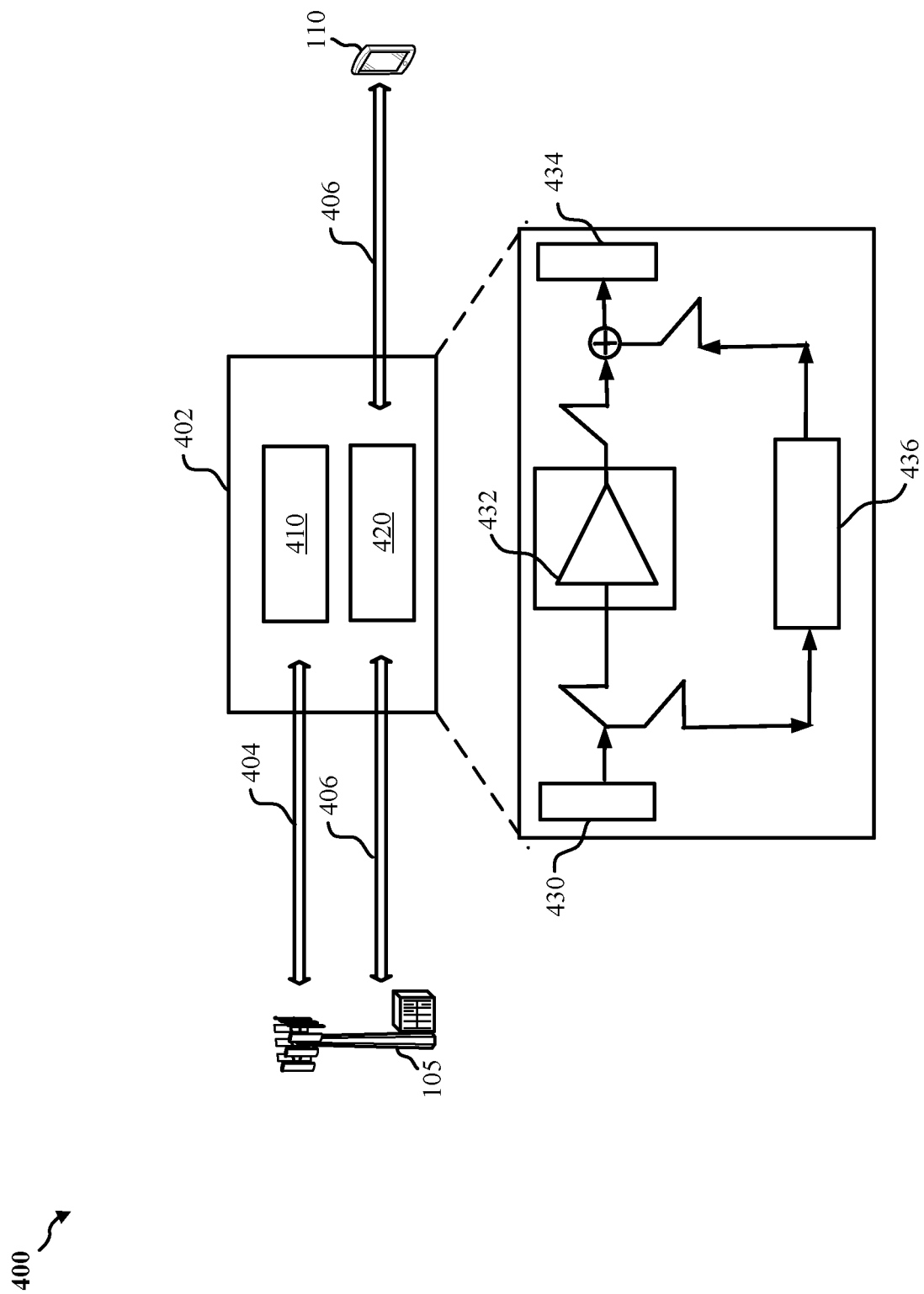
FIG. 4 illustrates an example of an environment for relaying signals using a repeater according to aspects of the present disclosure.

FIG. 4 illustrates an example of an environment for relaying signals using a repeater. In an aspect of the present disclosure, an environment 400 may include the base station 105, a repeater 402, and the UE 110. The BS 105 may utilize a control path 404 to carry UL and/or DL signals to configure the repeater 402. The BS 105 may utilize a data path 406 to receive analog UL signals from the UE 110 and/or transmit analog DL signals to the UE 110. For example, the BS 105 may configure the repeater 402 by transmitting DL signals and/or receive UL signals from a mobile termination (MT) 410 of the repeater 402. The BS 105 may transmit DL signals and/or receive UL signals to/from a remote unit (RU) 420 of the repeater 402. The repeater 402 and/or the RU 420 may include RF circuitry (described below) to amplify the signals along the data path 406. As such, the repeater 402 may be controlled by the BS 105 acting as a data unit (DU).

In certain aspects, the repeater 402 may include a RX array 430 configured to receive input data signals and/or input control signals. The repeater 402 may include one or more amplifiers 432 configured to amplify the input data signals. The repeater 402 may include a TX array 434 configured to transmit the amplified input data signals. The repeater 402 may include a baseband processor 436 that receives the input control signals. Based on the input control signals, the baseband processor 436 may change the configuration of the repeater 402 such as beamforming, amplification, port mapping, etc., as discussed below.

Figure 5:
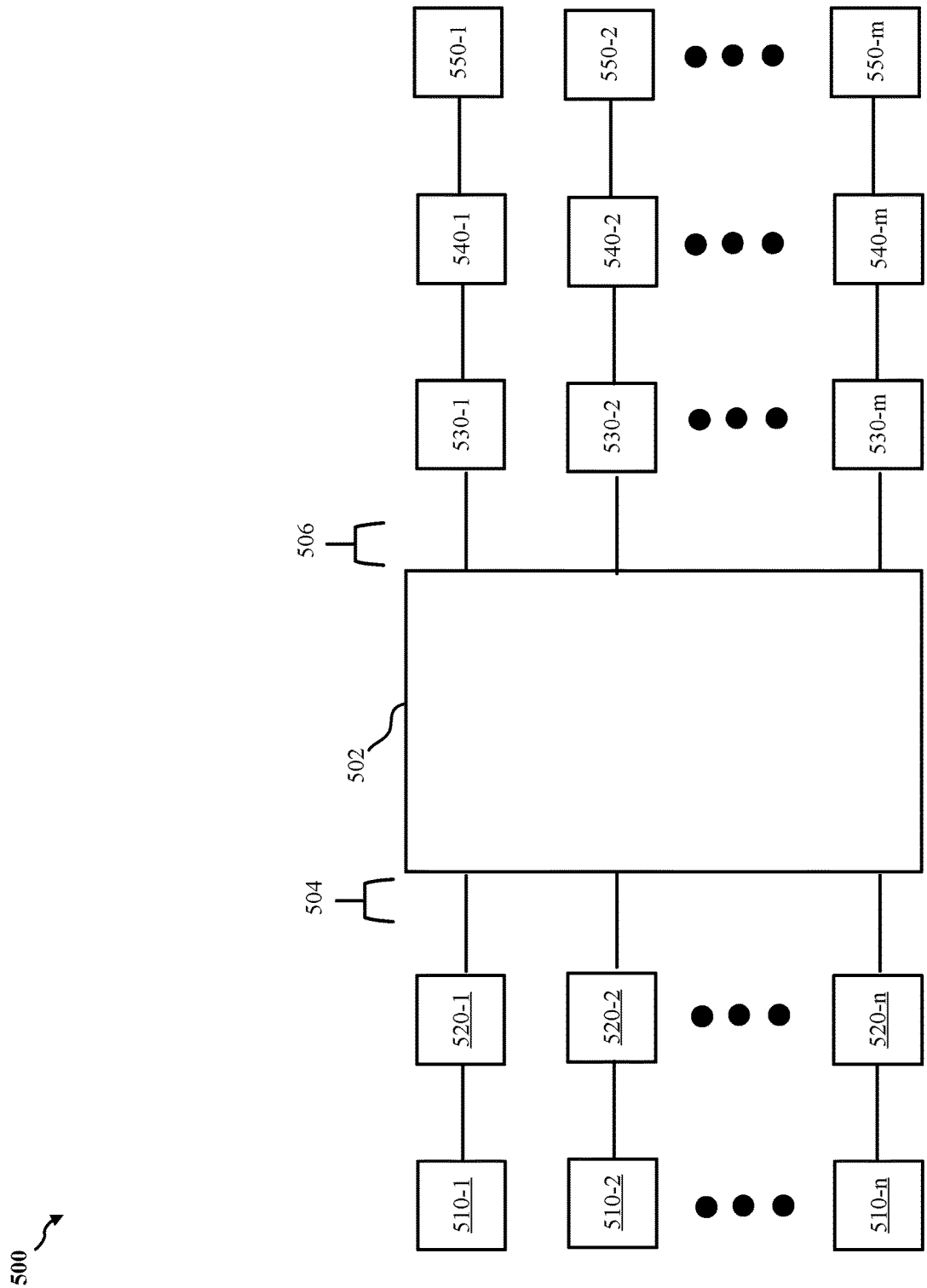
FIG. 5 illustrates an example of a repeater according to aspects of the present disclosure.

FIG. 5 illustrates an example of a repeater. The repeater may have n input paths and m output paths, where n and m are positive integers. Each path may include RF control modules, power amplifiers, and/or other circuit components. The RF control modules may include phase shifters and/or switches to tune beamforming vectors. Each path may include antenna arrays, antenna subarrays, and/or antenna elements. Power amplifiers may amplify the signal strengths. In one implementation, multiple paths may share the same antenna array/subarray/element, but with different RF control modules. In another implementation, two or more paths may use the same antenna array/subarray/element, but include different polarizations (e.g., vertical or horizontal polarizations. Each of the antenna arrays/subarrays/elements may be configured for input or output at different time (based on UL/DL data information). In some aspects, the repeater may be implemented as a full duplex repeater for simultaneous input/output.

In an aspect, a repeater 500 may include a mapping module 502. The repeater 500 may include input ports 504 and output ports 506. The repeater 500 may include one or more input arrays 510-1, 510-2 . . . 510-$n$, where n is a positive integer. The repeater 500 may include input RF control modules 520-1, 520-2 . . . 520-$n$. The repeater 500 may include power amplifiers 530-1, 530-2 . . . 530-$m$, where m is a positive integer that may be the same or different from n. The repeater 500 may include output RF control modules 540-1, 540-2 . . . 540-$m$. The repeater 500 may include one or more output arrays 550-1, 550-2 . . . 550-$m$, where m is indicated above.

In some aspects of the present disclosure, the repeater 500 may receive input signals via one or more of the one or more input arrays 510-1, 510-2 . . . 510-$n$. The input signals may be processed by one or more of the input RF control modules 520-1, 520-2 . . . 520-$n$ (e.g., phase shift, amplification, polarization, etc.). The mapping module 502 may map the input signals to two or more of the output ports 506 as output signals. Two or more of the power amplifiers 530-1, 530-2 . . . 530-$m$ may amplify the output signals. Two or more of the output RF control modules 540-1, 540-2 . . . 540-$m$ may process the output signals (e.g., phase shift, amplification, polarization, beamforming, etc.). The output signals may be transmitted by one or more of the output arrays 550-1, 550-2 . . . 550-$m$ of the repeater 500.

In an aspect of the present disclosure, the mapping module 502 of the repeater 500 may determine how each input path/port is mapped to output ports. The mapping module 502 may include one or more of combiners, power amplifiers, phase shifters, switches, polarizers, etc. Each realization of the mapping module may correspond to a n*m matrix. The realizable mapping matrices may be implemented as mapping codebook. The repeater 500 may be configured to use certain predetermined mapping matrix, based on the input signals, output signals, and/or other variables.

In certain implementations of the present disclosure, during the integration phase, the repeater 500 may transmit a report to the network and/or the base station, such as the BS 105. The report may indicate a maximum number of input and/or output ports, a maximum number of streams (i.e., data) the repeater 500 is able to relay, a maximum number of BSs the repeater 500 is able to connect to at a time, a maximum number of UEs the repeater is able to connect to at a time, a size of mapping codebook, the mapping codebook, and/or other relevant information. The BS 105 may use the information in the report to determine training procedure and/or port mapping matrix (both discussed below). The mapping codebook may be available to the network (via standards) and/or transmitted by the repeater 500.

In some implementations, the repeater 500 may simultaneously couple with one or more BSs 105 with one or more UEs 110. The repeater 500 may be configured to relay data and/or control information using beamforming.

In an implementation of the training procedure for downlink data relay, at step0, the BS 105 may optionally determine a candidate beam for each of the input ports 504 and/or each of the output ports 506. For the output beams (TX beam for access link), the base station may configure the repeater 500 to perform a beam sweep at each of the output ports 506, and receive UE feedback regarding the values of the performance parameters (e.g., reference signal received power (RSRP)) associated with the beam sweep to the base station. Based on the feedback, the BS 105 may determine the desired beam for each of the output ports 506. For the input beams (RX beams for fronthaul link), the BS 105 may configure the repeater 500 to perform P1/P2/P3 beam sweep to the desired beam pair of the fronthaul for each of the input ports 504. Based on the P1/P2/P3 beam sweep procedure, the BS 105 may determine the desired beam for each of the input ports 504. The BS 105 may transmit a notification indicating the desired beams for the input ports 504 and/or the output ports 506.

In some implementations of the training procedure for downlink data relay, at step1, the BS 105 may configure the repeater 500 to use the desired beams, based on the feedback information from step0, to relay channel state information (CSI) reference signals (CSI-RSs) in a number of symbols. Same or different mapping matrix may be used for each symbol. The BS 105 may optionally configure the UE 110 to receive the CSI-RSs symbols, and provide feedback CSI (e.g., RSRP, channel quality information (CQI), rank indicator (RI), pre-coding matrix indicator (PMI), etc.) to the BS 105.

In optional implementations, the repeater 500 may determine the matrix mappings for relaying the CSI-RSs without input from the BS 105. Alternatively, the BS 105 may configure the repeater 500 to use certain mapping matrix for relaying the CSI-RSs.

In an implementation of the training procedure for downlink data relay, at step2, the BS 105 may transmit data information to be relayed by the repeater 500. The BS 105 may indicate to the repeater 500 which beam and/or mapping matrix to use to relay the data information, based on the feedback information in step0 and/or step 1. For example, the BS 105 may indicate the repeater 500 to utilize the mapping matrix and the beams used during the relaying of CSI-RSs in the $i^{th}$ symbol (in step1) for relaying the current data information.

In an implementation of the training procedure for uplink data relay, at step0, the BS 105 may optionally determine a candidate beam for each of the input ports 504 and/or each of the output ports 506. For the output beams (TX beam for access link), the base station may configure the repeater 500 to perform a beam sweep at each of the output ports 506, and receive UE feedback regarding the values of the performance parameters (e.g., reference signal received power (RSRP)) associated with the beam sweep to the base station. Based on the feedback, the BS 105 may determine the desired beam for each of the output ports 506. For the input beams (RX beams for fronthaul link), the BS 105 may configure the repeater 500 to perform P1/P2/P3 beam sweep to the desired beam pair of the fronthaul for each of the input ports 504. Based on the P1/P2/P3 beam sweep procedure, the BS 105 may determine the desired beam for each of the input ports 504. The BS 105 may transmit a notification indicating the desired beams for the input ports 504 and/or the output ports 506.

In an implementation of the training procedure for uplink data relay, at step 1, the BS 105 may configure the repeater 500 to use the desired beams for each of the input ports 504 and/or the output ports 506 for receiving and/or relaying sounding reference signals (SRSs) in a number of symbols. Same or different mapping matrix may be used for each symbol. The BS 105 may configure the UE 110 to send the SRSs using the same TX beams (determined above) in the number of symbols. The BS 105 may configure which beams to use at each of the input ports 504 and/or the output ports 506 (based on the feedback from step0). The BS 105 may measure the SRSs transmitted by the UE 110 and relayed by the repeater 500 to determine one or more of the beam configuration and/or the matrix mapping.

In optional implementations, the repeater 500 may determine the matrix mappings for relaying the SRSs without input from the BS 105. Alternatively, the BS 105 may configure the repeater 500 to use certain mapping matrix for relaying the SRSs.

In an implementation of the training procedure for uplink data relay, at step2, the UE 110 may transmit data information to be relayed by the repeater 500. The BS 105 may indicate to the repeater 500 which beam and/or mapping matrix to use to relay the data information, based on the feedback information in step0 and/or step1. For example, the BS 105 may indicate the repeater 500 to utilize the mapping matrix and the beams used during the relaying of SRSs in the $i^{th}$ symbol (in step1) for relaying the current data information.

In a non-limiting example, a single base station, such as the BS 105, may transmit a single data stream to a single UE, such as the UE 110. The repeater 500 may relay the data stream. Specifically, the data stream may be received from one input port of the input ports 504 and mapped to the output ports 506 (m output ports total). The phase of each output path may be adjusted independently (by one or more of the repeater 500, the power amplifiers 530, the output RF control modules 540, and/or the output arrays 550). The phase adjustments (i.e., mapping vector) may be determined such that the m outputs are coherently phased when received at the UE 110 after going through propagation channels. The mapping vector used for relaying the data stream may have higher performance than other mapping vectors (e.g., lower noise, higher signal-to-noise-interference ratio, etc.). The mapping vector may depend on location and/or environment of the UE 110, the BS 105, and/or the propagation channel. The mapping vector may be selected using the procedures indicated above.

Figure 6:
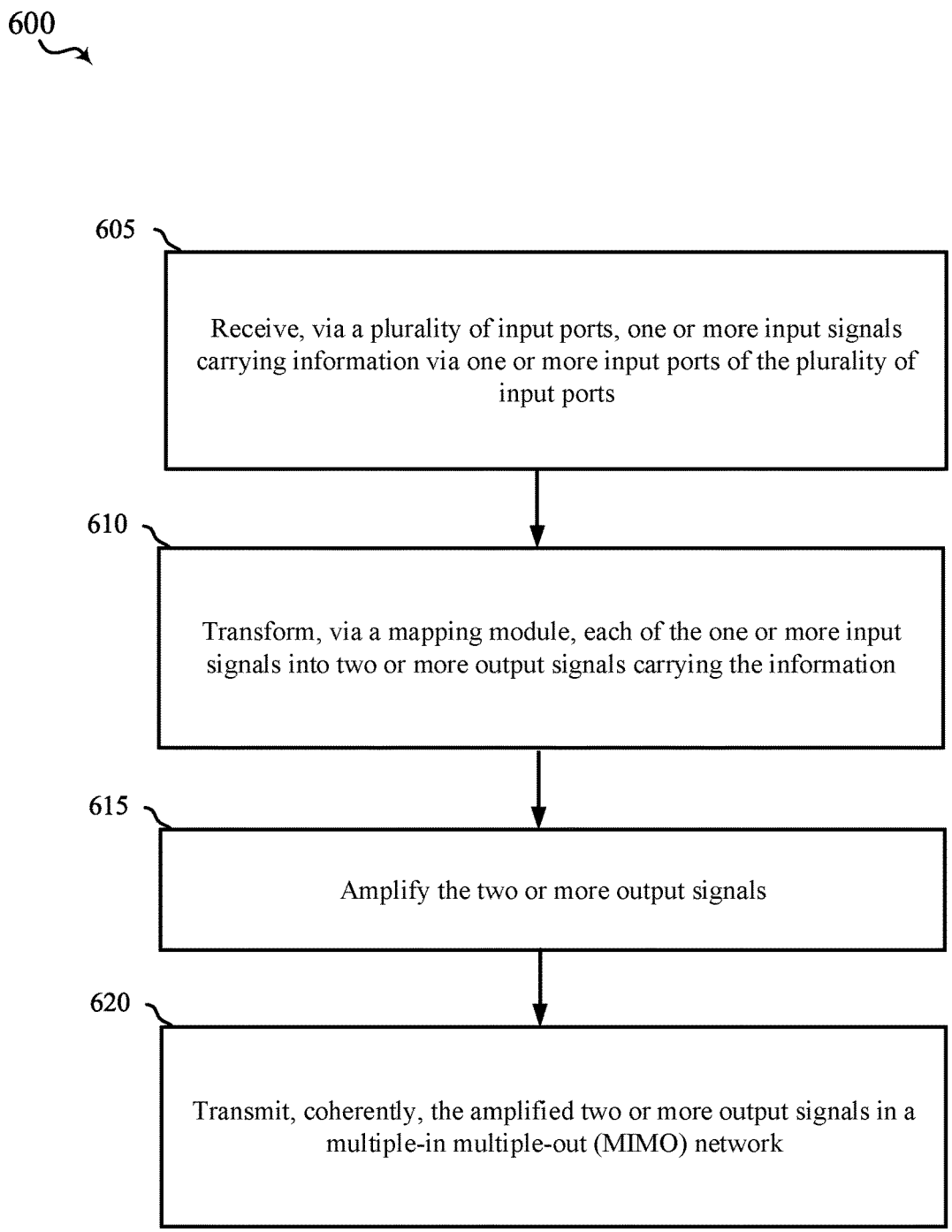
FIG. 6 illustrates an example of a method for relaying information using a repeater according to aspects of the present disclosure.

FIG. 6 illustrates an example of a method for relaying information using a repeater. For example, a method 600 may be performed by a repeater, such as the repeater 500, and/or one or more components of the repeater in the wireless communication network 100, such as the mapping module 502, the input ports 504, the output ports, the one or more input arrays 510, the one or more input RF control modules 520, the power amplifiers 530, the one or more output RF control modules 540, and/or the one or more output arrays 550.

At block 605, the method 600 may receive, via a plurality of input ports, one or more input signals carrying information via one or more input ports of the plurality of input ports. For example, the input ports 504, the one or more input arrays 510, the one or more input RF control modules 520, and/or the mapping module 502 of the repeater 500 may receive, via a plurality of input ports, one or more input signals carrying information via one or more input ports of the plurality of input ports as described above.

In certain implementations, the input ports 504, the one or more input arrays 510, the one or more input RF control modules 520, and/or the mapping module 502 of the repeater 500 may be configured to and/or may define means for receiving, via a plurality of input ports, one or more input signals carrying information via one or more input ports of the plurality of input ports.

At block 610, the method 600 may transform, via a mapping module, each of the one or more input signals into two or more output signals carrying the information. For example, the mapping module 502 of the repeater 500 may transform, via a mapping module, each of the one or more input signals into two or more output signals carrying the information as described above.

In certain implementations, the mapping module 502 of the repeater 500 may be configured to and/or may define means for transforming, via a mapping module, each of the one or more input signals into two or more output signals carrying the information.

At block 615, the method 600 may amplify the two or more output signals. For example, the one or more input RF control modules 520, the power amplifiers 530, the one or more output RF control modules 540, and/or the mapping module 502 of the repeater 500 may amplify the two or more output signals.

In certain implementations, the one or more input RF control modules 520, the power amplifiers 530, the one or more output RF control modules 540, and/or the mapping module 502 of the repeater 500 may be configured to and/or may define means for amplifying the two or more output signals.

At block 620, the method 600 may transmit, coherently, the amplified two or more output signals in a multiple-in multiple-out (MIMO) network. For example, the output ports 506, the power amplifiers 530, the one or more output RF control modules 540, the one or more output arrays 550, and/or the mapping module 502 of the repeater 500 may transmit, coherently, the amplified two or more output signals in a multiple-in multiple-out (MIMO) network.

In certain implementations, the output ports 506, the power amplifiers 530, the one or more output RF control modules 540, the one or more output arrays 550, and/or the mapping module 502 of the repeater 500 may be configured to and/or may define means for transmitting, coherently, the amplified two or more output signals in a multiple-in multiple-out (MIMO) network.

Alternatively or additionally, the method 600 may further include any of the methods above, wherein the repeater comprises a plurality of input antenna arrays communicatively coupled with the plurality of input ports, and a plurality of output antenna arrays communicatively coupled with the plurality of output ports.

Alternatively or additionally, the method 600 may further include any of the methods above, wherein each of the plurality of input antenna arrays is communicatively coupled with a corresponding input port of the plurality of input ports, and each of the plurality of output antenna arrays is communicatively coupled with a corresponding output port of the plurality of output ports.

Alternatively or additionally, the method 600 may further include any of the methods above, wherein the repeater comprises a plurality of input radio frequency (RF) control modules communicatively coupled with the plurality of input ports, and a plurality of output RF control modules communicatively coupled with the plurality of output ports.

Alternatively or additionally, the method 600 may further include any of the methods above, wherein the repeater comprises a plurality of power amplifiers with each configured to communicatively couple with the plurality of output ports.

Alternatively or additionally, the method 600 may further include any of the methods above, further comprising polarizing the two or more output signals or the amplified two or more output signals. The polarization may be performed by a polarizer.

Alternatively or additionally, the method 600 may further include any of the methods above, wherein polarizing comprises: vertically polarizing a first output signal or a first amplified output signal, and horizontally polarizing a second output signal or a second amplified output signal.

Alternatively or additionally, the method 600 may further include any of the methods above, further comprising mapping each of the plurality of input ports to one or more of the plurality of output ports. The mapping module 502 may perform the mapping from the input ports to the output ports.

Alternatively or additionally, the method 600 may further include any of the methods above, wherein the mapping module comprises one or more combiners, one or more splitters, one or more amplifiers, one or more phase shifters, or one or more switches.

Alternatively or additionally, the method 600 may further include any of the methods above, wherein the mapping module comprises a plurality of variable gain amplifiers (VGAs) each communicatively coupled with the plurality of input ports, the plurality of VGAs being configured to amplify the one or more input signals.

Alternatively or additionally, the method 600 may further include any of the methods above, further comprising performing a beam sweep for each of the plurality of output ports, selecting a beam for each of the plurality of output ports based on the corresponding beam sweep, receiving a first plurality of reference signals at the plurality of input ports, transforming the first plurality of reference signals to a second plurality of reference signals, transmitting the second plurality of reference signals via the plurality of output ports using the corresponding selected beams, receiving an indication from a base station to transmit downlink data information or downlink control information via one or more output ports of the plurality of output ports, receiving the downlink data information or the downlink control information from the base station, and transmitting the downlink data information or the downlink control information via the indicated one or more output ports using the corresponding selected beams.

Alternatively or additionally, the method 600 may further include any of the methods above, further comprising performing an input beam sweep for each of the plurality of input ports, selecting an input beam for each of the plurality of input ports based on the corresponding input beam sweep, receiving a second indication from the base station to receive downlink data information or downlink control information via the one or more input ports of the plurality of input ports, and receiving the downlink data information or the downlink control information from the base station via the indicated one or more input ports using the corresponding selected input beams.

Alternatively or additionally, the method 600 may further include any of the methods above, further comprising performing a beam sweep for each of the plurality of input ports, selecting a beam for each of the plurality of input ports based on the corresponding beam sweep, receiving a first plurality of reference signals at the plurality of output ports, transforming the first plurality of reference signals to a second plurality of reference signals, transmitting the second plurality of reference signals via the plurality of input ports using the corresponding selected beams, receiving an indication from a base station to transmit uplink data information or uplink control information via the one or more input ports of the plurality of input ports, receiving the uplink data information or the uplink control information from a user equipment, and transmitting the uplink data information or the uplink control information via the indicated one or more input ports using the corresponding selected beams.

Alternatively or additionally, the method 600 may further include any of the methods above, further comprising performing an output beam sweep for each of the plurality of output ports, selecting an output beam for each of the plurality of output ports based on the corresponding output beam sweep, receiving a second indication from the base station to receive uplink data information or uplink control information via one or more output ports of the plurality of output ports, and receiving the uplink data information or the uplink control information from the user equipment via the indicated one or more output ports using the corresponding selected output beams.

Alternatively or additionally, the method 600 may further include any of the methods above, further comprising transmitting, to a base station, a report indicating one or more of a number of the plurality of input ports, a number of the plurality of output ports, a number of base stations connectable to the repeater, a number of user equipment connectable to the repeater, a size of a mapping codebook, or the mapping codebook.

Figure 7:
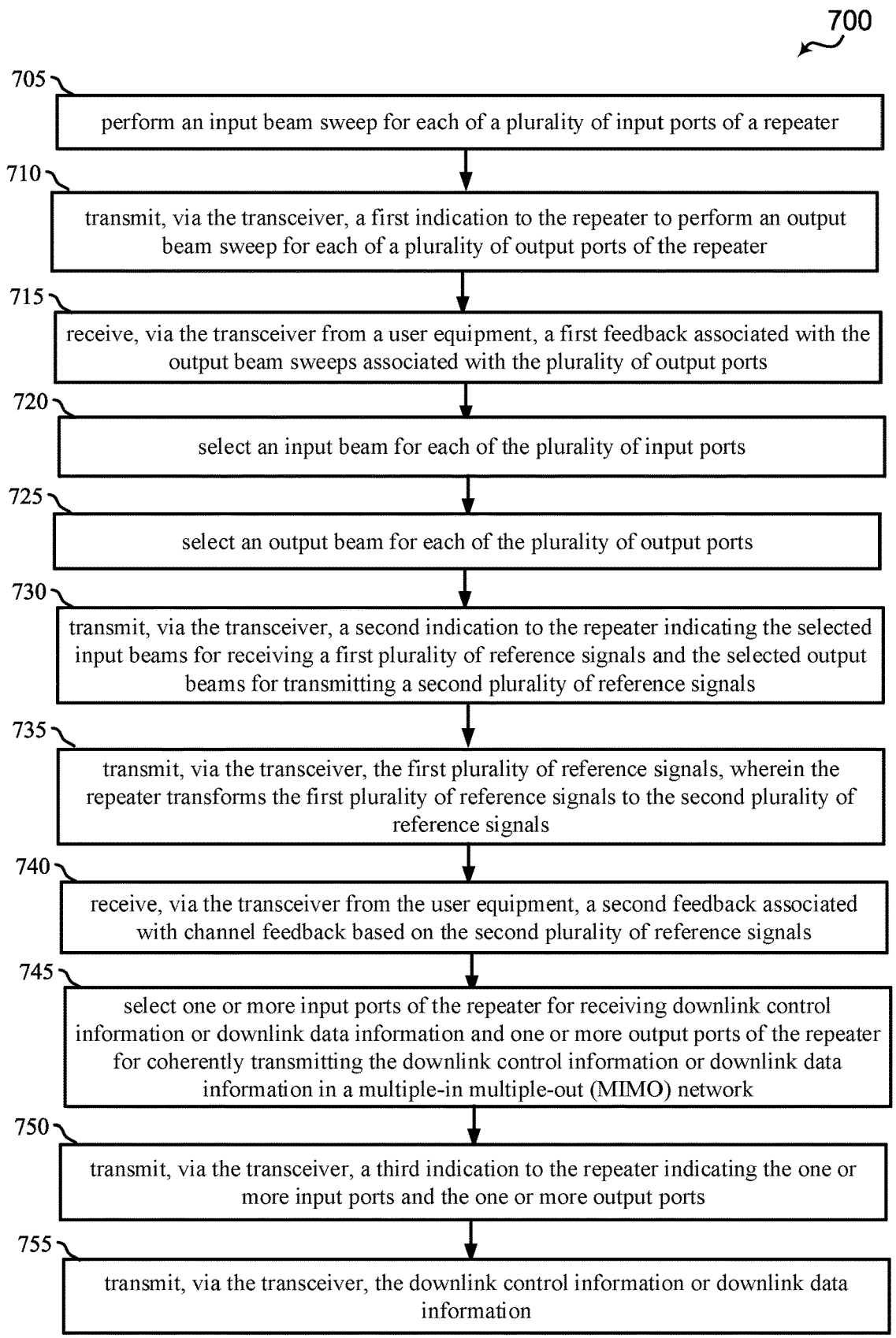
FIG. 7 illustrates an example of a method for a training procedure for downlink data relay according to aspects of the present disclosure.

FIG. 7 illustrates an example of a method for a training procedure for downlink data relay. For example, a method 700 may be performed by the communication component 322, the selection component 324, the modem 320, the transciever 302, the RF front end 388, the processor 312, the memory 316, and/or the applications 375 of the BS 105.

At block 705, the method 700 may perform an input beam sweep for each of a plurality of input ports of a repeater. For example, the communication component 322, the modem 320, the transciever 302, the RF front end 388, the processor 312, the memory 316, and/or the applications 375 may perform an input beam sweep for each of a plurality of input ports of a repeater as described above.

In certain implementations, the communication component 322, the modem 320, the transciever 302, the RF front end 388, the processor 312, the memory 316, and/or the applications 375 may be configured to and/or may define means for performing an input beam sweep for each of a plurality of input ports of a repeater.

At block 710, the method 700 may transmit, via the transceiver, a first indication to the repeater to perform an output beam sweep for each of a plurality of output ports of the repeater. For example, the communication component 322, the modem 320, the transciever 302, the RF front end 388, the processor 312, the memory 316, and/or the applications 375 may transmit, via the transceiver, a first indication to the repeater to perform an output beam sweep for each of a plurality of output ports of the repeater as described above.

In certain implementations, the communication component 322, the modem 320, the transciever 302, the RF front end 388, the processor 312, the memory 316, and/or the applications 375 may be configured to and/or may define means for transmitting, via the transceiver, a first indication to the repeater to perform an output beam sweep for each of a plurality of output ports of the repeater.

At block 715, the method 700 may receive, via the transceiver from a user equipment, a first feedback associated with the output beam sweeps associated with the plurality of output ports. For example, the communication component 322, the modem 320, the transciever 302, the RF front end 388, the processor 312, the memory 316, and/or the applications 375 may receive, via the transceiver from a user equipment, a first feedback associated with the output beam sweeps associated with the plurality of output ports as described above.

In certain implementations, the communication component 322, the modem 320, the transciever 302, the RF front end 388, the processor 312, the memory 316, and/or the applications 375 may be configured to and/or may define means for receiving, via the transceiver from a user equipment, a first feedback associated with the output beam sweeps associated with the plurality of output ports.

At block 720, the method 700 may select an input beam for each of the plurality of input ports. For example, the selection component 324, the modem 320, the processor 312, the memory 316, and/or the applications 375 may select an input beam for each of the plurality of input ports as described above. The selection component 324 may select an input beam based on performance parameters associated with the input beams (e.g., RSRP).

In certain implementations, the communication component 322, the modem 320, the transciever 302, the RF front end 388, the processor 312, the memory 316, and/or the applications 375 may be configured to and/or may define means for selecting an input beam for each of the plurality of input ports.

At block 725, the method 700 may select an output beam for each of the plurality of output ports. For example, the selection component 324, the modem 320, the processor 312, the memory 316, and/or the applications 375 may select an output beam for each of the plurality of output ports as described above. The selection component 324 may select an output beam based on performance parameters associated with the output beams (e.g., RSRP).

In certain implementations, the communication component 322, the modem 320, the transciever 302, the RF front end 388, the processor 312, the memory 316, and/or the applications 375 may be configured to and/or may define means for selecting an output beam for each of the plurality of output ports.

At block 730, the method 700 may transmit, via the transceiver, a second indication to the repeater indicating the selected input beams for receiving a first plurality of reference signals and the selected output beams for transmitting a second plurality of reference signals. For example, the communication component 322, the modem 320, the transciever 302, the RF front end 388, the processor 312, the memory 316, and/or the applications 375 may transmit, via the transceiver, a second indication to the repeater indicating the selected input beams for receiving a first plurality of reference signals and the selected output beams for transmitting a second plurality of reference signals as described above.

In certain implementations, the communication component 322, the modem 320, the transciever 302, the RF front end 388, the processor 312, the memory 316, and/or the applications 375 may be configured to and/or may define means for transmitting, via the transceiver, a second indication to the repeater indicating the selected input beams for receiving a first plurality of reference signals and the selected output beams for transmitting a second plurality of reference signals.

At block 735, the method 700 may transmit, via the transceiver, the first plurality of reference signals, wherein the repeater transforms the first plurality of reference signals to the second plurality of reference signals. For example, the communication component 322, the modem 320, the transciever 302, the RF front end 388, the processor 312, the memory 316, and/or the applications 375 may transmit, via the transceiver, the first plurality of reference signals, wherein the repeater transforms the first plurality of reference signals to the second plurality of reference signals as described above.

In certain implementations, the communication component 322, the modem 320, the transciever 302, the RF front end 388, the processor 312, the memory 316, and/or the applications 375 may be configured to and/or may define means for transmitting, via the transceiver, the first plurality of reference signals, wherein the repeater transforms the first plurality of reference signals to the second plurality of reference signals.

At block 740, the method 700 may receive, via the transceiver from the user equipment, a second feedback associated with channel feedback based on the second plurality of reference signals. For example, the communication component 322, the modem 320, the transceiver 302, the RF front end 388, the processor 312, the memory 316, and/or the applications 375 may receive, via the transceiver from the user equipment, a second feedback associated with channel feedback based on the second plurality of reference signals as described above.

In certain implementations, the communication component 322, the modem 320, the transceiver 302, the RF front end 388, the processor 312, the memory 316, and/or the applications 375 may be configured to and/or may define means for receiving, via the transceiver from the user equipment, a second feedback associated with channel feedback based on the second plurality of reference signals.

At block 745, the method 700 may select one or more input ports of the repeater for receiving downlink control information or downlink data information and one or more output ports of the repeater for coherently transmitting the downlink control information or downlink data information in a multiple-in multiple-out (MIMO) network. For example, the selection component 324, the modem 320, the processor 312, the memory 316, and/or the applications 375 may select one or more input ports of the repeater for receiving downlink control information or downlink data information and one or more output ports of the repeater for coherently transmitting the downlink control information or downlink data information in a multiple-in multiple-out (MIMO) network as described above.

In certain implementations, the communication component 322, the modem 320, the transceiver 302, the RF front end 388, the processor 312, the memory 316, and/or the applications 375 may be configured to and/or may define means for selecting one or more input ports of the repeater for receiving downlink control information or downlink data information and one or more output ports of the repeater for coherently transmitting the downlink control information or downlink data information in a multiple-in multiple-out (MIMO) network.

At block 750, the method 700 may transmit, via the transceiver, a third indication to the repeater indicating the one or more input ports and the one or more output ports. For example, the communication component 322, the modem 320, the transceiver 302, the RF front end 388, the processor 312, the memory 316, and/or the applications 375 may transmit, via the transceiver, a third indication to the repeater indicating the one or more input ports and the one or more output ports as described above.

In certain implementations, the communication component 322, the modem 320, the transceiver 302, the RF front end 388, the processor 312, the memory 316, and/or the applications 375 may be configured to and/or may define means for transmitting, via the transceiver, a third indication to the repeater indicating the one or more input ports and the one or more output ports.

At block 755, the method 700 may transmit, via the transceiver, the downlink control information or downlink data information. For example, the communication component 322, the modem 320, the transciever 302, the RF front end 388, the processor 312, the memory 316, and/or the applications 375 may transmit, via the transceiver, the downlink control information or downlink data information as described above.

In certain implementations, the communication component 322, the modem 320, the transceiver 302, the RF front end 388, the processor 312, the memory 316, and/or the applications 375 may be configured to and/or may define means for transmitting, via the transceiver, the downlink control information or downlink data information.

Figure 8:
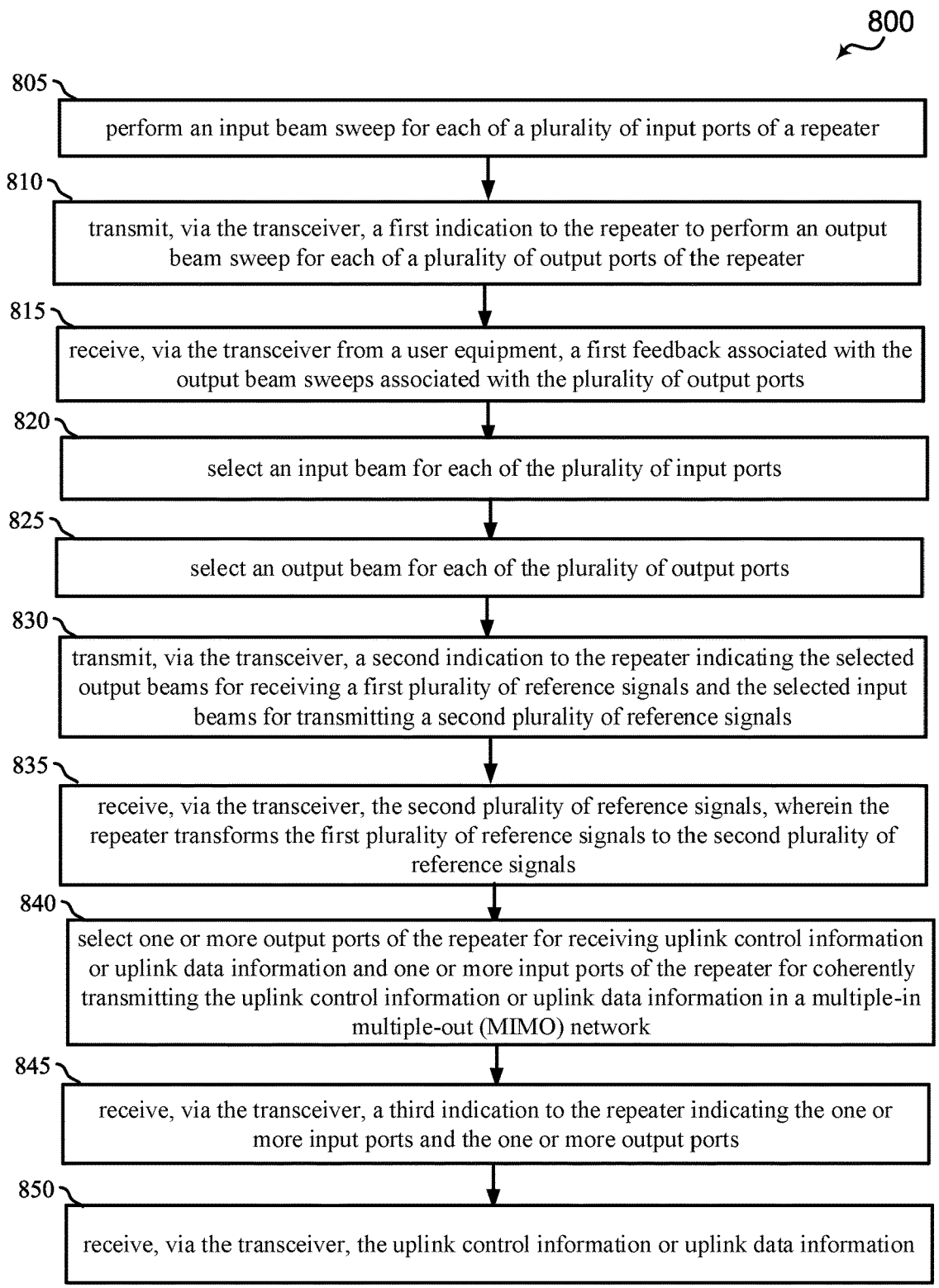
FIG. 8 illustrates an example of a method for a training procedure for uplink data relay according to aspects of the present disclosure.

FIG. 8 illustrates an example of a method for a training procedure for uplink data relay. For example, a method 800 may be performed by the communication component 322, the selection component 324, the modem 320, the transciever 302, the RF front end 388, the processor 312, the memory 316, and/or the applications 375 of the BS 105.

At block 805, the method 800 may perform an input beam sweep for each of a plurality of input ports of a repeater. For example, the communication component 322, the modem 320, the transciever 302, the RF front end 388, the processor 312, the memory 316, and/or the applications 375 may perform an input beam sweep for each of a plurality of input ports of a repeater as described above.

In certain implementations, the communication component 322, the modem 320, the transciever 302, the RF front end 388, the processor 312, the memory 316, and/or the applications 375 may be configured to and/or may define means for performing an input beam sweep for each of a plurality of input ports of a repeater.

At block 810, the method 800 may transmit, via the transceiver, a first indication to the repeater to perform an output beam sweep for each of a plurality of output ports of the repeater. For example, the communication component 322, the modem 320, the transceiver 302, the RF front end 388, the processor 312, the memory 316, and/or the applications 375 may transmit, via the transceiver, a first indication to the repeater to perform an output beam sweep for each of a plurality of output ports of the repeater as described above.

In certain implementations, the communication component 322, the modem 320, the transceiver 302, the RF front end 388, the processor 312, the memory 316, and/or the applications 375 may be configured to and/or may define means for transmitting, via the transceiver, a first indication to the repeater to perform an output beam sweep for each of a plurality of output ports of the repeater.

At block 815, the method 800 may receive, via the transceiver from a user equipment, a first feedback associated with the output beam sweeps associated with the plurality of output ports. For example, the communication component 322, the modem 320, the transciever 302, the RF front end 388, the processor 312, the memory 316, and/or the applications 375 may receive, via the transceiver from a user equipment, a first feedback associated with the output beam sweeps associated with the plurality of output ports as described above.

In certain implementations, the communication component 322, the modem 320, the transciever 302, the RF front end 388, the processor 312, the memory 316, and/or the applications 375 may be configured to and/or may define means for receiving, via the transceiver from a user equipment, a first feedback associated with the output beam sweeps associated with the plurality of output ports.

At block 820, the method 800 may select an input beam for each of the plurality of input ports. For example, the selection component 324, the modem 320, the processor 312, the memory 316, and/or the applications 375 may select an input beam for each of the plurality of input ports as described above. The selection component 324 may select an input beam based on performance parameters associated with the input beams (e.g., RSRP).

In certain implementations, the communication component 322, the modem 320, the transceiver 302, the RF front end 388, the processor 312, the memory 316, and/or the applications 375 may be configured to and/or may define means for selecting an input beam for each of the plurality of input ports.

At block 825, the method 800 may select an output beam for each of the plurality of output ports. For example, the selection component 324, the modem 320, the processor 312, the memory 316, and/or the applications 375 may select an output beam for each of the plurality of output ports as described above. The selection component 324 may select an output beam based on performance parameters associated with the output beams (e.g., RSRP).

In certain implementations, the communication component 322, the modem 320, the transciever 302, the RF front end 388, the processor 312, the memory 316, and/or the applications 375 may be configured to and/or may define means for selecting an output beam for each of the plurality of output ports.

At block 830, the method 800 may transmit, via the transceiver, a second indication to the repeater indicating the selected output beams for receiving a first plurality of reference signals and the selected input beams for transmitting a second plurality of reference signals. For example, the communication component 322, the modem 320, the transciever 302, the RF front end 388, the processor 312, the memory 316, and/or the applications 375 may transmit, via the transceiver, a second indication to the repeater indicating the selected output beams for receiving a first plurality of reference signals and the selected input beams for transmitting a second plurality of reference signals as described above.

In certain implementations, the communication component 322, the modem 320, the transciever 302, the RF front end 388, the processor 312, the memory 316, and/or the applications 375 may be configured to and/or may define means for transmitting, via the transceiver, a second indication to the repeater indicating the selected output beams for receiving a first plurality of reference signals and the selected input beams for transmitting a second plurality of reference signals.

At block 835, the method 800 may receive, via the transceiver, the second plurality of reference signals, wherein the repeater transforms the first plurality of reference signals to the second plurality of reference signals. For example, the communication component 322, the modem 320, the transciever 302, the RF front end 388, the processor 312, the memory 316, and/or the applications 375 may receive, via the transceiver, the second plurality of reference signals, wherein the repeater transforms the first plurality of reference signals to the second plurality of reference signals as described above.

In certain implementations, the communication component 322, the modem 320, the transciever 302, the RF front end 388, the processor 312, the memory 316, and/or the applications 375 may be configured to and/or may define means for receiving, via the transceiver, the second plurality of reference signals, wherein the repeater transforms the first plurality of reference signals to the second plurality of reference signals.

At block 840, the method 800 may select one or more output ports of the repeater for receiving uplink control information or uplink data information and one or more input ports of the repeater for coherently transmitting the uplink control information or uplink data information in a multiple-in multiple-out (MIMO) network. For example, the selection component 324, the modem 320, the processor 312, the memory 316, and/or the applications 375 may select one or more output ports of the repeater for receiving uplink control information or uplink data information and one or more input ports of the repeater for coherently transmitting the uplink control information or uplink data information in a multiple-in multiple-out (MIMO) network as described above.

In certain implementations, the communication component 322, the modem 320, the transciever 302, the RF front end 388, the processor 312, the memory 316, and/or the applications 375 may be configured to and/or may define means for selecting one or more output ports of the repeater for receiving uplink control information or uplink data information and one or more input ports of the repeater for coherently transmitting the uplink control information or uplink data information in a multiple-in multiple-out (MIMO) network.

At block 845, the method 800 may receive, via the transceiver, a third indication to the repeater indicating the one or more input ports and the one or more output ports. For example, the communication component 322, the modem 320, the transciever 302, the RF front end 388, the processor 312, the memory 316, and/or the applications 375 may receive, via the transceiver, a third indication to the repeater indicating the one or more input ports and the one or more output ports as described above.

In certain implementations, the communication component 322, the modem 320, the transciever 302, the RF front end 388, the processor 312, the memory 316, and/or the applications 375 may be configured to and/or may define means for receiving, via the transceiver, a third indication to the repeater indicating the one or more input ports and the one or more output ports.

At block 850, the method 800 may receive, via the transceiver, the uplink control information or uplink data information. For example, the communication component 322, the modem 320, the transceiver 302, the RF front end 388, the processor 312, the memory 316, and/or the applications 375 may receive, via the transceiver, the uplink control information or uplink data information as described above.

In certain implementations, the communication component 322, the modem 320, the transciever 302, the RF front end 388, the processor 312, the memory 316, and/or the applications 375 may be configured to and/or may define means for receiving, via the transceiver, the uplink control information or uplink data information.

Figure 9:
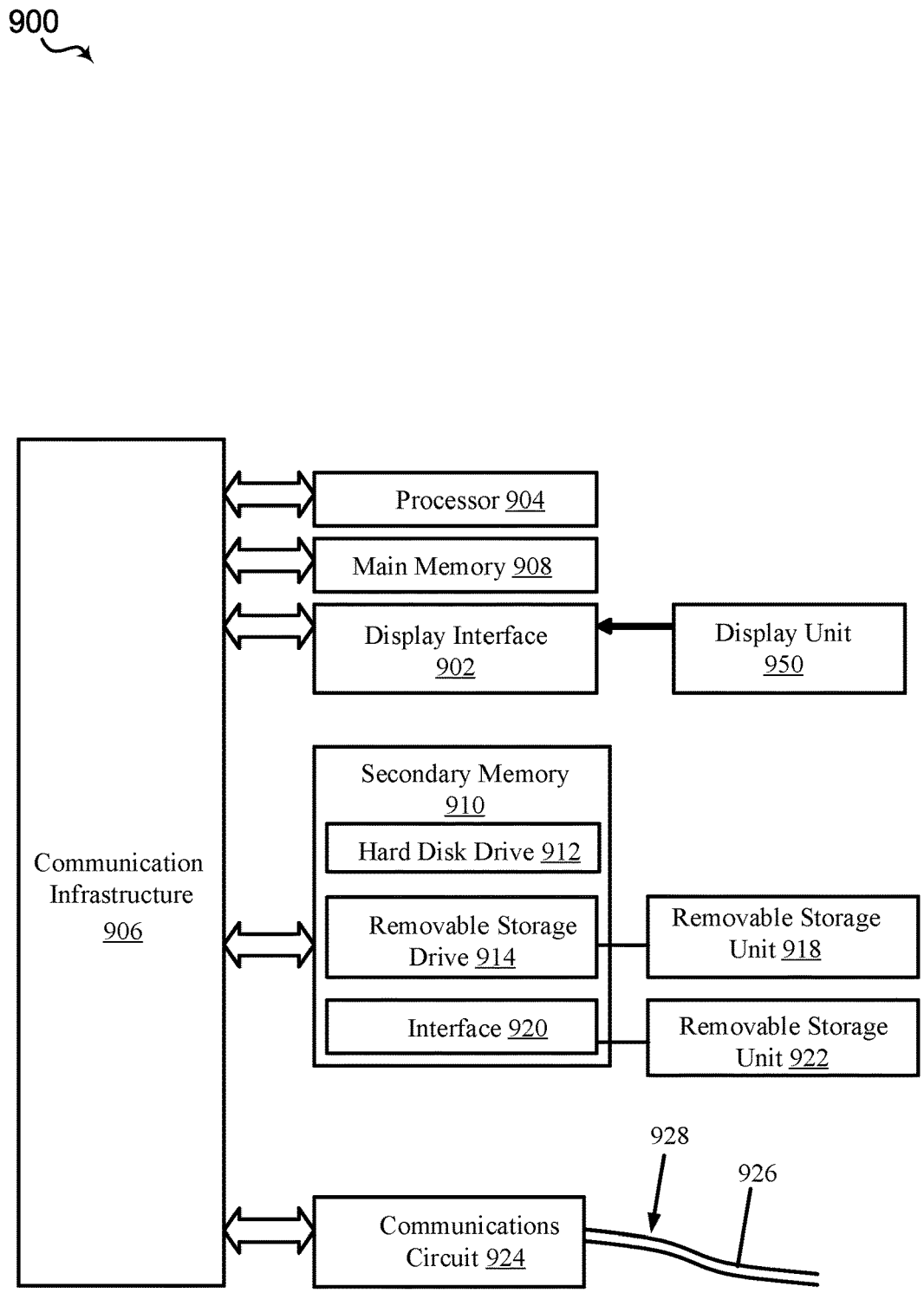
FIG. 9 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 900 is shown in FIG. 9. In some examples, the repeater 500 may be implemented as the computer system 900 shown in FIG. 9. The repeater 500 may include some or all of the components of the computer system 900.

The computer system 900 includes one or more processors, such as processor 904. The processor 904 is connected with a communication infrastructure 906 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 900 may include a display interface 902 that forwards graphics, text, and other data from the communication infrastructure 906 (or from a frame buffer not shown) for display on a display unit 950. Computer system 900 also includes a main memory 908, preferably random access memory (RAM), and may also include a secondary memory 910. The secondary memory 910 may include, for example, a hard disk drive 912, and/or a removable storage drive 914, representing a floppy disk drive, a magnetic tape drive, an optical disk drive, a universal serial bus (USB) flash drive, etc. The removable storage drive 914 reads from and/or writes to a removable storage unit 918 in a well-known manner. Removable storage unit 918 represents a floppy disk, magnetic tape, optical disk, USB flash drive etc., which is read by and written to removable storage drive 914. As will be appreciated, the removable storage unit 918 includes a computer usable storage medium having stored therein computer software and/or data. In some examples, one or more of the main memory 908, the secondary memory 910, the removable storage unit 918, and/or the removable storage unit 922 may be a non-transitory memory.

Alternative aspects of the present disclosures may include secondary memory 910 and may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and the removable storage unit 922 and the interface 920, which allow software and data to be transferred from the removable storage unit 922 to computer system 900.

Computer system 900 may also include a communications circuit 924. The communications circuit 924 may allow software and data to be transferred between computer system 900 and external devices. Examples of the communications circuit 924 may include a modem, a network interface (such as an Ethernet card), a communications port, a Personal Computer Memory Card International Association (PCMCIA) slot and card, etc. Software and data transferred via the communications circuit 924 are in the form of signals 928, which may be electronic, electromagnetic, optical or other signals capable of being received by the communications circuit 924. These signals 928 are provided to the communications circuit 924 via a communications path (e.g., channel) 926. This path 926 carries signals 928 and may be implemented using wire or cable, fiber optics, a telephone line, a cellular link, an RF link and/or other communications channels. In this document, the terms "computer program medium" and "computer usable medium" are used to refer generally to media such as the removable storage unit 918, a hard disk installed in hard disk drive 912, and signals 928. These computer program products provide software to the computer system 900. Aspects of the present disclosures are directed to such computer program products.

Computer programs (also referred to as computer control logic) are stored in main memory 908 and/or secondary memory 910. Computer programs may also be received via communications circuit 924. Such computer programs, when executed, enable the computer system 900 to perform the features in accordance with aspects of the present disclosures, as discussed herein. In particular, the computer programs, when executed, enable the processor 904 to perform the features in accordance with aspects of the present disclosures. Accordingly, such computer programs represent controllers of the computer system 900.

In an aspect of the present disclosures where the method is implemented using software, the software may be stored in a computer program product and loaded into computer system 900 using removable storage drive 914, hard disk drive 912, or the interface 920. The control logic (software), when executed by the processor 904, causes the processor 904 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Additional Implementations

Aspects of the present disclosure include methods by a repeater for receiving, via a plurality of input ports, one or more input signals carrying information via one or more input ports of the plurality of input ports, transforming, via a mapping module each of the one or more input signals into two or more output signals carrying the information, amplifying the two or more output signals, and transmitting, coherently, the amplified two or more output signals in a multiple-in multiple-out (MIMO) network.

Any of the methods above, wherein the repeater comprises a plurality of input antenna arrays communicatively coupled with the plurality of input ports, and a plurality of output antenna arrays communicatively coupled with the plurality of output ports.

Any of the methods above, wherein each of the plurality of input antenna arrays is communicatively coupled with a corresponding input port of the plurality of input ports, and each of the plurality of output antenna arrays is communicatively coupled with a corresponding output port of the plurality of output ports.

Any of the methods above, wherein the repeater comprises a plurality of input radio frequency (RF) control modules communicatively coupled with the plurality of input ports, and a plurality of output RF control modules communicatively coupled with the plurality of output ports.

Any of the methods above, wherein the repeater comprises a plurality of power amplifiers with each configured to communicatively couple with the plurality of output ports.

Any of the methods above, further comprising polarizing the two or more output signals or the amplified two or more output signals.

Any of the methods above, wherein polarizing comprises: vertically polarizing a first output signal or a first amplified output signal, and horizontally polarizing a second output signal or a second amplified output signal.

Any of the methods above, further comprising mapping each of the plurality of input ports to one or more of the plurality of output ports.

Any of the methods above, wherein the mapping module comprises one or more combiners, one or more splitters, one or more amplifiers, one or more phase shifters, or one or more switches.

Any of the methods above, wherein the mapping module comprises a plurality of variable gain amplifiers (VGAs)

each communicatively coupled with the plurality of input ports, the plurality of VGAs being configured to amplify the one or more input signals.

Any of the methods above, further comprising performing a beam sweep for each of the plurality of output ports, selecting a beam for each of the plurality of output ports based on the corresponding beam sweep, receiving a first plurality of reference signals at the plurality of input ports, transforming the first plurality of reference signals to a second plurality of reference signals, transmitting the second plurality of reference signals via the plurality of output ports using the corresponding selected beams, receiving an indication from a base station to transmit downlink data information or downlink control information via one or more output ports of the plurality of output ports, receiving the downlink data information or the downlink control information from the base station, and transmitting the downlink data information or the downlink control information via the indicated one or more output ports using the corresponding selected beams.

Any of the methods above, further comprising performing an input beam sweep for each of the plurality of input ports, selecting an input beam for each of the plurality of input ports based on the corresponding input beam sweep, receiving a second indication from the base station to receive downlink data information or downlink control information via the one or more input ports of the plurality of input ports, and receiving the downlink data information or the downlink control information from the base station via the indicated one or more input ports using the corresponding selected input beams.

Any of the methods above, further comprising performing a beam sweep for each of the plurality of input ports, selecting a beam for each of the plurality of input ports based on the corresponding beam sweep, receiving a first plurality of reference signals at the plurality of output ports, transforming the first plurality of reference signals to a second plurality of reference signals, transmitting the second plurality of reference signals via the plurality of input ports using the corresponding selected beams, receiving an indication from a base station to transmit uplink data information or uplink control information via the one or more input ports of the plurality of input ports, receiving the uplink data information or the uplink control information from a user equipment, and transmitting the uplink data information or the uplink control information via the indicated one or more input ports using the corresponding selected beams.

Any of the methods above, further comprising performing an output beam sweep for each of the plurality of output ports, selecting an output beam for each of the plurality of output ports based on the corresponding output beam sweep, receiving a second indication from the base station to receive uplink data information or uplink control information via one or more output ports of the plurality of output ports, and receiving the uplink data information or the uplink control information from the user equipment via the indicated one or more output ports using the corresponding selected output beams.

Any of the methods above, further comprising transmitting, to a base station, a report indicating one or more of a number of the plurality of input ports, a number of the plurality of output ports, a number of base stations connectable to the repeater, a number of user equipment connectable to the repeater, a size of a mapping codebook, or the mapping codebook.

Other aspects of the present disclosure include a repeater including a plurality of input ports configured to receive one or more input signals carrying information via one or more input ports of the plurality of input ports, a mapping module configured to transform each of the one or more input signals into two or more output signals carrying the information, and a plurality of output ports configured to amplify the two or more output signals and transmit, coherently, the amplified two or more output signals in a multiple-in multiple-out (MIMO) network.

Any of the repeater above, further comprising a plurality of input antenna arrays communicatively coupled with the plurality of input ports and a plurality of output antenna arrays communicatively coupled with the plurality of output ports.

Any of the repeater above, wherein each of the plurality of input antenna arrays is communicatively coupled with a corresponding input port of the plurality of input ports and each of the plurality of output antenna arrays is communicatively coupled with a corresponding output port of the plurality of output ports.

Any of the repeater above, further comprising a plurality of input radio frequency (RF) control modules communicatively coupled with the plurality of input ports and a plurality of output RF control modules communicatively coupled with the plurality of output ports.

Any of the repeater above, further comprising a plurality of power amplifiers with each configured to communicatively couple with the plurality of output ports.

Any of the repeater above, further comprising a plurality of polarizers configured to polarize the two or more output signals or the amplified two or more output signals.

Any of the repeater above, wherein a first polarizer of the plurality of polarizers is configured to vertically polarize a first output signal or a first amplified output signal and a second polarizer of the plurality of polarizers is configured to horizontally polarize a second output signal or a second amplified output signal.

Any of the repeater above, wherein the mapping module is further configured to map each of the plurality of input ports to one or more of the plurality of output ports.

Any of the repeater above, wherein the mapping module comprises one or more combiners, one or more splitters, one or more amplifiers, one or more phase shifters, or one or more switches.

Any of the repeater above, wherein the mapping module comprises a plurality of variable gain amplifiers (VGAs) each communicatively coupled with the plurality of input ports, the plurality of VGAs being configured to amplify the one or more input signals.

Any of the repeater above, wherein the mapping module is further configured to perform a beam sweep for each of the plurality of output ports, select a beam for each of the plurality of output ports based on the corresponding beam sweep, receive a first plurality of reference signals at the plurality of input ports, transform the first plurality of reference signals to a second plurality of reference signals, transmit the second plurality of reference signals via the plurality of output ports using the corresponding selected beams, receive an indication from a base station to transmit downlink data information or downlink control information via one or more output ports of the plurality of output ports, receive the downlink data information or the downlink control information from the base station, and transmit the downlink data information or the downlink control information via the indicated one or more output ports using the corresponding selected beams.

Any of the repeater above, wherein the mapping module is further configured to perform an input beam sweep for each of the plurality of input ports, select an input beam for each of the plurality of input ports based on the corresponding input beam sweep, receive a second indication from the base station to receive downlink data information or downlink control information via the one or more input ports of the plurality of input ports, and receive the downlink data information or the downlink control information from the base station via the indicated one or more input ports using the corresponding selected input beams.

Any of the repeater above, wherein the first plurality of reference signals and the second plurality of reference signals are channel state information (CSI) reference signals.

Any of the repeater above, wherein the mapping module is further configured to perform a beam sweep for each of the plurality of input ports, select a beam for each of the plurality of input ports based on the corresponding beam sweep, receive a first plurality of reference signals at the plurality of output ports, transform the first plurality of reference signals to a second plurality of reference signals, transmit the second plurality of reference signals via the plurality of input ports using the corresponding selected beams, receive an indication from a base station to transmit uplink data information or uplink control information via the one or more input ports of the plurality of input ports, receive the uplink data information or the uplink control information from a user equipment, and transmit the uplink data information or the uplink control information via the indicated one or more input ports using the corresponding selected beams.

Any of the repeater above, wherein the mapping module is further configured to: perform an output beam sweep for each of the plurality of output ports, select an output beam for each of the plurality of output ports based on the corresponding output beam sweep, receive a second indication from the base station to receive uplink data information or uplink control information via one or more output ports of the plurality of output ports, and receive the uplink data information or the uplink control information from the user equipment via the indicated one or more output ports using the corresponding selected output beams.

Any of the repeater above, wherein the first plurality of reference signals and the second plurality of reference signals are sounding reference signals.

Any of the repeater above, wherein the mapping module is further configured to transmit, to a base station, a report indicating one or more of a number of the plurality of input ports, a number of the plurality of output ports, a number of base stations connectable to the repeater, a number of user equipment connectable to the repeater, a size of a mapping codebook, or the mapping codebook.

Aspects of the present disclosure include a non-transitory computer readable medium having instructions that, when executed by a processor of a repeater, causes the processor to cause a plurality of input ports to receive one or more input signals carrying information via one or more input ports of the plurality of input ports, cause a mapping module to transform each of the one or more input signals into two or more output signals carrying the information, cause a plurality of power amplifiers to amplify the two or more output signals, and cause a plurality of output ports to transmit the amplified two or more output signals in a multiple-in multiple-out (MIMO) network.

Any of the non-transitory computer readable media above, wherein the repeater comprises a plurality of input antenna arrays communicatively coupled with the plurality of input ports, and a plurality of output antenna arrays communicatively coupled with the plurality of output ports.

Any of the non-transitory computer readable media above, wherein each of the plurality of input antenna arrays is communicatively coupled with a corresponding input port of the plurality of input ports, and each of the plurality of output antenna arrays is communicatively coupled with a corresponding output port of the plurality of output ports.

Any of the non-transitory computer readable media above, wherein the repeater comprises a plurality of input radio frequency (RF) control modules communicatively coupled with the plurality of input ports, and a plurality of output RF control modules communicatively coupled with the plurality of output ports.

Any of the non-transitory computer readable media above, wherein the repeater comprises a plurality of power amplifiers with each configured to communicatively couple with the plurality of output ports.

Any of the non-transitory computer readable media above, further comprising instructions for polarizing the two or more output signals or the amplified two or more output signals.

Any of the non-transitory computer readable media above, wherein polarizing comprises: vertically polarizing a first output signal or a first amplified output signal, and horizontally polarizing a second output signal or a second amplified output signal.

Any of the non-transitory computer readable media above, further comprising instructions for mapping each of the plurality of input ports to one or more of the plurality of output ports.

Any of the non-transitory computer readable media above, wherein the mapping module comprises one or more combiners, one or more splitters, one or more amplifiers, one or more phase shifters, or one or more switches.

Any of the non-transitory computer readable media above, wherein the mapping module comprises a plurality of variable gain amplifiers (VGAs) each communicatively coupled with the plurality of input ports, the plurality of VGAs being configured to amplify the one or more input signals.

Any of the non-transitory computer readable media above, further comprising instructions for performing a beam sweep for each of the plurality of output ports, selecting a beam for each of the plurality of output ports based on the corresponding beam sweep, receiving a first plurality of reference signals at the plurality of input ports, transforming the first plurality of reference signals to a second plurality of reference signals, transmitting the second plurality of reference signals via the plurality of output ports using the corresponding selected beams, receiving an indication from a base station to transmit downlink data information or downlink control information via one or more output ports of the plurality of output ports, receiving the downlink data information or the downlink control information from the base station, and transmitting the downlink data information or the downlink control information via the indicated one or more output ports using the corresponding selected beams.

Any of the non-transitory computer readable media above, further comprising instructions for performing an input beam sweep for each of the plurality of input ports, selecting an input beam for each of the plurality of input ports based on the corresponding input beam sweep, receiving a second indication from the base station to receive downlink data information or downlink control information via the one or more input ports of the plurality of input ports, and receiving the downlink data information or the downlink control information from the base station via the indicated one or more input ports using the corresponding selected input beams.

Any of the non-transitory computer readable media above, further comprising instructions for performing a beam sweep for each of the plurality of input ports, selecting a beam for each of the plurality of input ports based on the corresponding beam sweep, receiving a first plurality of reference signals at the plurality of output ports, transforming the first plurality of reference signals to a second plurality of reference signals, transmitting the second plurality of reference signals via the plurality of input ports using the corresponding selected beams, receiving an indication from a base station to transmit uplink data information or uplink control information via the one or more input ports of the plurality of input ports, receiving the uplink data information or the uplink control information from a user equipment, and transmitting the uplink data information or the uplink control information via the indicated one or more input ports using the corresponding selected beams.

Any of the non-transitory computer readable media above, further comprising instructions for performing an output beam sweep for each of the plurality of output ports, selecting an output beam for each of the plurality of output ports based on the corresponding output beam sweep, receiving a second indication from the base station to receive uplink data information or uplink control information via one or more output ports of the plurality of output ports, and receiving the uplink data information or the uplink control information from the user equipment via the indicated one or more output ports using the corresponding selected output beams.

Any of the non-transitory computer readable media above, further comprising instructions for transmitting, to a base station, a report indicating one or more of a number of the plurality of input ports, a number of the plurality of output ports, a number of base stations connectable to the repeater, a number of user equipment connectable to the repeater, a size of a mapping codebook, or the mapping codebook.

Aspects of the present disclosure include a repeater comprising means for receiving, via a plurality of input ports, one or more input signals carrying information via one or more input ports of the plurality of input ports, means for transforming, via a mapping module each of the one or more input signals into two or more output signals carrying the information, means for amplifying the two or more output signals, and means for transmitting, coherently, the amplified two or more output signals in a multiple-in multiple-out (MIMO) network.

Aspects of the present disclosure include a method by a BS including performing an input beam sweep for each of a plurality of input ports of a repeater, transmitting, via the transceiver, a first indication to the repeater to perform an output beam sweep for each of a plurality of output ports of the repeater, receiving, via the transceiver from a user equipment, a first feedback associated with the output beam sweeps associated with the plurality of output ports, selecting an input beam for each of the plurality of input ports, selecting an output beam for each of the plurality of output ports, transmitting, via the transceiver, a second indication to the repeater indicating the selected input beams for receiving a first plurality of reference signals and the selected output beams for transmitting a second plurality of reference signals, transmitting, via the transceiver, the first plurality of reference signals, wherein the repeater transforms the first plurality of reference signals to the second plurality of reference signals, receiving, via the transceiver from the user equipment, a second feedback associated with channel feedback based on the second plurality of reference signals, selecting one or more input ports of the repeater for receiving downlink control information or downlink data information and one or more output ports of the repeater for coherently transmitting the downlink control information or downlink data information in a multiple-in multiple-out (MIMO) network, transmitting, via the transceiver, a third indication to the repeater indicating the one or more input ports and the one or more output ports, and transmitting, via the transceiver, the downlink control information or downlink data information.

Any of the method above, wherein the first plurality of reference signals include channel state information (CSI) reference signals (CSI-RSs).

Any of the method above, wherein the channel feedback includes at least one of reference signal received power (RSRP) information, channel quality information (CSI), rank indication (RI) information, or precoding matrix indicator (PMI) information.

Any of the method above, wherein the third indication includes a mapping from the one or more input ports to the one or more output ports.

Any of the method above, further comprising receiving, from the repeater, a report indicating one or more of a number of the plurality of input ports, a number of the plurality of output ports, a number of base stations connectable to the repeater, a number of user equipment connectable to the repeater, a size of a mapping codebook, or the mapping codebook.

Certain aspects of the present disclosure include a BS having a memory having instructions, a transceiver, and one or more processors communicatively coupled with the memory and the transceiver, the one or more processors are configured to execute the instructions to perform an input beam sweep for each of a plurality of input ports of a repeater, transmit, via the transceiver, a first indication to the repeater to perform an output beam sweep for each of a plurality of output ports of the repeater, receive, via the transceiver from a user equipment, a first feedback associated with the output beam sweeps associated with the plurality of output ports, select an input beam for each of the plurality of input ports, select an output beam for each of the plurality of output ports, transmit, via the transceiver, a second indication to the repeater indicating the selected input beams for receiving a first plurality of reference signals and the selected output beams for transmitting a second plurality of reference signals, transmit, via the transceiver, the first plurality of reference signals, wherein the repeater transforms the first plurality of reference signals to the second plurality of reference signals, receive, via the transceiver from the user equipment, a second feedback associated with channel feedback based on the second plurality of reference signals, select one or more input ports of the repeater for receiving downlink control information or downlink data information and one or more output ports of the repeater for coherently transmitting the downlink control information or downlink data information in a multiple-in multiple-out (MIMO) network, transmit, via the transceiver, a third indication to the repeater indicating the one or more input ports and the one or more output ports, and transmit, via the transceiver, the downlink control information or downlink data information.

Any of the BS above, wherein the first plurality of reference signals include channel state information (CSI) reference signals (CSI-RSs).

Any of the BS above, wherein the channel feedback includes at least one of reference signal received power (RSRP) information, channel quality information (CSI), rank indication (RI) information, or precoding matrix indicator (PMI) information.

Any of the BS above, wherein the third indication includes a mapping from the one or more input ports to the one or more output ports.

Any of the BS above, wherein the one or more processors is further configured to receive, from the repeater, a report indicating one or more of a number of the plurality of input ports, a number of the plurality of output ports, a number of base stations connectable to the repeater, a number of user equipment connectable to the repeater, a size of a mapping codebook, or the mapping codebook.

Aspects of the present disclosure include a method by a BS including performing an input beam sweep for each of a plurality of input ports of a repeater, transmitting, via the transceiver, a first indication to the repeater to perform an output beam sweep for each of a plurality of output ports of the repeater, receiving, via the transceiver from a user equipment, a first feedback associated with the output beam sweeps associated with the plurality of output ports, selecting an input beam for each of the plurality of input ports, selecting an output beam for each of the plurality of output ports, transmitting, via the transceiver, a second indication to the repeater indicating the selected output beams for receiving a first plurality of reference signals and the selected input beams for transmitting a second plurality of reference signals, receiving, via the transceiver, the second plurality of reference signals, wherein the repeater transforms the first plurality of reference signals to the second plurality of reference signals, selecting one or more output ports of the repeater for receiving uplink control information or uplink data information and one or more input ports of the repeater for coherently transmitting the uplink control information or uplink data information in a multiple-in multiple-out (MIMO) network, receiving, via the transceiver, a third indication to the repeater indicating the one or more input ports and the one or more output ports, and receiving, via the transceiver, the uplink control information or uplink data information.

Any of the method above, wherein the second plurality of reference signals include sounding reference signals (SRSs).

Any of the method above, wherein the third indication includes a mapping from the one or more output ports to the one or more input ports.

Any of the method above, wherein the one or more processors are configured to determine the mapping based on the second plurality of reference signals.

Any of the method above, further comprising receiving, from the repeater, a report indicating one or more of a number of the plurality of input ports, a number of the plurality of output ports, a number of base stations connectable to the repeater, a number of user equipment connectable to the repeater, a size of a mapping codebook, or the mapping codebook.

Certain aspects of the present disclosure include a BS having a memory having instructions, a transceiver, and one or more processors communicatively coupled with the memory and the transceiver, the one or more processors are configured to execute the instructions to perform an input beam sweep for each of a plurality of input ports of a repeater, transmit, via the transceiver, a first indication to the repeater to perform an output beam sweep for each of a plurality of output ports of the repeater, receive, via the transceiver from a user equipment, a first feedback associated with the output beam sweeps associated with the plurality of output ports, select an input beam for each of the plurality of input ports, select an output beam for each of the plurality of output ports, transmit, via the transceiver, a second indication to the repeater indicating the selected output beams for receiving a first plurality of reference signals and the selected input beams for transmitting a second plurality of reference signals, receive, via the transceiver, the second plurality of reference signals, wherein the repeater transforms the first plurality of reference signals to the second plurality of reference signals, select one or more output ports of the repeater for receiving uplink control information or uplink data information and one or more input ports of the repeater for coherently transmitting the uplink control information or uplink data information in a multiple-in multiple-out (MIMO) network, receive, via the transceiver, a third indication to the repeater indicating the one or more input ports and the one or more output ports, and receive, via the transceiver, the uplink control information or uplink data information.

Any of the BS above, wherein the second plurality of reference signals include sounding reference signals (SRSs).

Any of the BS above, wherein the third indication includes a mapping from the one or more output ports to the one or more input ports.

Any of the BS above, wherein the one or more processors are configured to determine the mapping based on the second plurality of reference signals.

Any of the BS above, wherein the one or more processors is further configured to receive, from the repeater, a report indicating one or more of a number of the plurality of input ports, a number of the plurality of output ports, a number of base stations connectable to the repeater, a number of user equipment connectable to the repeater, a size of a mapping codebook, or the mapping codebook.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMTM, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a repeater in a network, comprising:
   receiving, via one or more of a plurality of input ports, one or more input signals carrying information;
   mapping, via a mapping module, one or more of the plurality of input ports to a subset of a plurality of output ports based on feedback information associated with a plurality of output beam sweep procedures;
   transforming, via the mapping module, each of the one or more input signals into two or more output signals carrying the information;
   amplifying the two or more output signals;
   adjusting, via the mapping module, phases of at least one of the two or more output signals such that the two or more output signals are coherently phased when received by a receiver; and
   transmitting, via the subset of the plurality of output ports, the two or more output signals in a multiple-in multiple-out (MIMO) network.

2. The method of claim 1, further comprising:
polarizing the two or more output signals or the amplified two or more output signals, wherein the polarizing comprises:
vertically polarizing a first output signal or a first amplified output signal; and
horizontally polarizing a second output signal or a second amplified output signal.

3. The method of claim 1, further comprising:
performing a beam sweep for each of the plurality of output ports;
selecting a beam for each of the plurality of output ports based on the corresponding beam sweep;
receiving a first plurality of reference signals at the plurality of input ports;
transforming the first plurality of reference signals to a second plurality of reference signals;
transmitting the second plurality of reference signals via the plurality of output ports using the corresponding selected beams;
receiving an indication from a base station to transmit downlink data information or downlink control information via one or more output ports of the plurality of output ports;
receiving the downlink data information or the downlink control information from the base station; and
transmitting the downlink data information or the downlink control information via the indicated one or more output ports using the corresponding selected beams.

4. The method of claim 3, further comprising:
performing an input beam sweep for each of the plurality of input ports;
selecting an input beam for each of the plurality of input ports based on the corresponding input beam sweep;
receiving a second indication from the base station to receive downlink data information or downlink control information via the one or more input ports of the plurality of input ports; and
receiving the downlink data information or the downlink control information from the base station via the indicated one or more input ports using the corresponding selected input beams.

5. The method of claim 1, further comprising:
performing a beam sweep for each of the plurality of input ports;
selecting a beam for each of the plurality of input ports based on the corresponding beam sweep;
receiving a first plurality of reference signals at the plurality of output ports;
transforming the first plurality of reference signals to a second plurality of reference signals;
transmitting the second plurality of reference signals via the plurality of input ports using the corresponding selected beams;
receiving an indication from a base station to transmit uplink data information or uplink control information via the one or more input ports of the plurality of input ports;
receiving the uplink data information or the uplink control information from a user equipment; and
transmitting the uplink data information or the uplink control information via the indicated one or more input ports using the corresponding selected beams.

6. The method of claim 5, further comprising:
performing an output beam sweep for each of the plurality of output ports;
selecting an output beam for each of the plurality of output ports based on the corresponding output beam sweep;
receiving a second indication from the base station to receive uplink data information or uplink control information via one or more output ports of the plurality of output ports; and
receiving the uplink data information or the uplink control information from the user equipment via the indicated one or more output ports using the corresponding selected output beams.

7. The method of claim 1, further comprising:
transmitting, to a base station, a report indicating one or more of a number of the plurality of input ports, a number of the plurality of output ports, a number of base stations connectable to the repeater, a number of user equipment connectable to the repeater, a size of a mapping codebook, or the mapping codebook.

8. A repeater, comprising:
a plurality of input ports configured to receive one or more input signals carrying information via one or more input ports of the plurality of input ports;
a mapping module configured to:
map the one or more of the plurality of input ports to a subset of a plurality of output ports based on feedback information associated with a plurality of output beam sweep procedures; and
transform each of the one or more input signals into two or more output signals carrying the information; and
a plurality of output ports configured to:
amplify the two or more output signals,
adjust, via the mapping module, phases of at least one of the two or more output signals such that the two or more output signals are coherently phased when received by a receiver; and
transmit, via the subset of the plurality of output ports, the two or more output signals in a multiple-in multiple-out (MIMO) network.

9. The repeater of claim 8, further comprising a plurality of input antenna arrays communicatively coupled with the plurality of input ports and a plurality of output antenna arrays communicatively coupled with the plurality of output ports.

10. The repeater of claim 9, wherein each of the plurality of input antenna arrays is communicatively coupled with a corresponding input port of the plurality of input ports and each of the plurality of output antenna arrays is communicatively coupled with a corresponding output port of the plurality of output ports.

11. The repeater of claim 8, further comprising a plurality of input radio frequency (RF) control modules communicatively coupled with the plurality of input ports and a plurality of output RF control modules communicatively coupled with the plurality of output ports.

12. The repeater of claim 8, further comprising a plurality of power amplifiers with each configured to communicatively couple with the plurality of output ports.

13. The repeater of claim 8, further comprising a plurality of polarizers configured to polarize the two or more output signals or the amplified two or more output signals.

14. The repeater of claim 13, wherein a first polarizer of the plurality of polarizers is configured to vertically polarize a first output signal or a first amplified output signal and a second polarizer of the plurality of polarizers is configured to horizontally polarize a second output signal or a second amplified output signal.

15. The repeater of claim 8, wherein the mapping module comprises one or more combiners, one or more splitters, one or more amplifiers, one or more phase shifters, or one or more switches.

16. The repeater of claim 8, wherein the mapping module comprises a plurality of variable gain amplifiers (VGAs) each communicatively coupled with the plurality of input ports, the plurality of VGAs being configured to amplify the one or more input signals.

17. The repeater of claim 8, wherein the mapping module is further configured to:
perform a beam sweep for each of the plurality of output ports;
select a beam for each of the plurality of output ports based on the corresponding beam sweep;
receive a first plurality of reference signals at the plurality of input ports;
transform the first plurality of reference signals to a second plurality of reference signals;
transmit the second plurality of reference signals via the plurality of output ports using the corresponding selected beams;
receive an indication from a base station to transmit downlink data information or downlink control information via one or more output ports of the plurality of output ports;
receive the downlink data information or the downlink control information from the base station; and
transmit the downlink data information or the downlink control information via the indicated one or more output ports using the corresponding selected beams.

18. The repeater of claim 17, wherein the first plurality of reference signals and the second plurality of reference signals are channel state information (CSI) reference signals.

19. The repeater of claim 17, wherein the mapping module is further configured to:
perform an input beam sweep for each of the plurality of input ports;
select an input beam for each of the plurality of input ports based on the corresponding input beam sweep;
receive a second indication from the base station to receive downlink data information or downlink control information via the one or more input ports of the plurality of input ports; and
receive the downlink data information or the downlink control information from the base station via the indicated one or more input ports using the corresponding selected input beams.

20. The repeater of claim 8, wherein the mapping module is further configured to:
perform a beam sweep for each of the plurality of input ports;
select a beam for each of the plurality of input ports based on the corresponding beam sweep;
receive a first plurality of reference signals at the plurality of output ports;
transform the first plurality of reference signals to a second plurality of reference signals;
transmit the second plurality of reference signals via the plurality of input ports using the corresponding selected beams;
receive an indication from a base station to transmit uplink data information or uplink control information via the one or more input ports of the plurality of input ports;
receive the uplink data information or the uplink control information from a user equipment; and
transmit the uplink data information or the uplink control information via the indicated one or more input ports using the corresponding selected beams.

21. The repeater of claim 20, wherein the mapping module is further configured to:
perform an output beam sweep for each of the plurality of output ports;
select an output beam for each of the plurality of output ports based on the corresponding output beam sweep;
receive a second indication from the base station to receive uplink data information or uplink control information via one or more output ports of the plurality of output ports; and
receive the uplink data information or the uplink control information from the user equipment via the indicated one or more output ports using the corresponding selected output beams.

22. The repeater of claim 20, wherein the first plurality of reference signals and the second plurality of reference signals are sounding reference signals.

23. The repeater of claim 8, wherein the mapping module is further configured to transmit, to a base station, a report indicating one or more of a number of the plurality of input ports, a number of the plurality of output ports, a number of base stations connectable to the repeater, a number of user equipment connectable to the repeater, a size of a mapping codebook, or the mapping codebook.

24. A repeater, comprising:
means for receiving, via one or more of a plurality of input ports, one or more input signals carrying information;
means for mapping, via a mapping module, one or more of the plurality of input ports to a subset of a plurality of output ports based on feedback information associated with a plurality of output beam sweep procedures;
means for transforming, via the mapping module, each of the one or more input signals into two or more output signals carrying the information;
means for amplifying the two or more output signals;
means for adjusting, via the mapping module, phases of at least one of the two or more output signals such that the two or more output signals are coherently phased when received by a receiver; and
means for transmitting, via the subset of the plurality of output ports, the two or more output signals in a multiple-in multiple-out (MIMO) network.

25. The repeater of claim 24, further comprising:
means for polarizing the two or more output signals or the amplified two or more output signals, wherein the means for polarizing comprises:
means for vertically polarizing a first output signal or a first amplified output signal; and
means for horizontally polarizing a second output signal or a second amplified output signal.

26. A non-transitory computer readable medium having instructions that, when executed by a processor of a repeater, causes the processor to:
cause a plurality of input ports to receive one or more input signals carrying information via one or more input ports of the plurality of input ports;
cause a mapping module to:
map the one or more of the plurality of input ports to a subset of a plurality of output ports based on feedback information associated with a plurality of output beam sweep procedures; and transform each of the one or more input signals into two or more output signals carrying the information;
cause a plurality of power amplifiers to amplify the two or more output signals;
cause the mapping module to adjust phases of at least one of the two or more output signals such that the two or more output signals are coherently phased when received by a receiver; and
cause a plurality of output ports to transmit, via the subset of the plurality of output ports, the two or more output signals in a multiple-in multiple-out (MIMO) network.

\* \* \* \* \*